United States Patent
Kim et al.

(10) Patent No.: US 9,410,032 B2
(45) Date of Patent: Aug. 9, 2016

(54) COMPOSITION FOR A STARCH CONTAINER, STARCH CONTAINER USING SAME, AND METHOD FOR MANUFACTURING THE STARCH CONTAINER

(75) Inventors: Heon Moo Kim, Gwangmyeong-si (KR); Kang Soo Kim, Ansan-si (KR)

(73) Assignee: Youl Chon Chemical Co., LTD., Seoul (KR)

( * ) Notice: Subject to any disclaimer, the term of this patent is extended or adjusted under 35 U.S.C. 154(b) by 352 days.

(21) Appl. No.: 14/115,012

(22) PCT Filed: May 17, 2012

(86) PCT No.: PCT/KR2012/003889
§ 371 (c)(1),
(2), (4) Date: Oct. 31, 2013

(87) PCT Pub. No.: WO2012/157973
PCT Pub. Date: Nov. 22, 2012

(65) Prior Publication Data
US 2014/0061089 A1    Mar. 6, 2014

(30) Foreign Application Priority Data
May 17, 2011    (KR) .................. 10-2011-0046084

(51) Int. Cl.
| | | |
|---|---|---|
| C08L 3/00 | (2006.01) | |
| C08L 1/02 | (2006.01) | |
| C08L 3/02 | (2006.01) | |
| C08L 97/02 | (2006.01) | |
| B29D 22/00 | (2006.01) | |
| C08J 9/32 | (2006.01) | |

(52) U.S. Cl.
CPC ............. *C08L 3/00* (2013.01); *B29D 22/003* (2013.01); *C08J 9/32* (2013.01); *C08L 1/02* (2013.01); *C08L 3/02* (2013.01); *C08L 97/02* (2013.01); *C08J 2203/22* (2013.01); *C08J 2303/02* (2013.01); *C08L 2201/06* (2013.01); *C08L 2205/16* (2013.01)

(58) Field of Classification Search
CPC .............. C08L 3/00; C08L 1/02; C08L 3/02; C08L 97/02; C08L 2201/06; C08L 2205/16; C08J 9/32; C08J 2203/22; C08J 2303/02; B29D 22/003
See application file for complete search history.

(56) References Cited

U.S. PATENT DOCUMENTS

| | | | |
|---|---|---|---|
| 7,931,949 B2 | 4/2011 | Kim et al. | |
| 7,931,950 B2 * | 4/2011 | Kim ................... | B65D 1/34 106/145.1 |
| 2007/0243346 A1 | 10/2007 | Kim et al. | |
| 2010/0075129 A1 | 3/2010 | Nagasaki et al. | |

FOREIGN PATENT DOCUMENTS

| | | |
|---|---|---|
| CN | 1088849 A | 7/1994 |
| CN | 1718622 A | 1/2006 |
| CN | 1856532 A | 11/2006 |
| CN | 101233205 A | 7/2008 |
| CN | 101535436 A | 9/2009 |
| JP | 05-039377 A | 2/1993 |
| JP | 07179643 A | 7/1995 |
| JP | 08-311243 A | 11/1996 |
| JP | 2000142658 A | 5/2000 |
| JP | 2005336454 A | 12/2005 |
| KR | 10-2003-0020565 A | 3/2003 |
| KR | 10-2004-0076150 A | 8/2004 |
| KR | 10-2006-0004493 A | 1/2006 |
| KR | 10-0559377 B1 | 3/2006 |
| KR | 10-2006-0097005 A | 9/2006 |
| WO | 2005/035638 A1 | 4/2005 |
| WO | 2005116129 A1 | 12/2005 |
| WO | 2007/014301 A2 | 2/2007 |
| WO | 2009153225 A1 | 12/2009 |

OTHER PUBLICATIONS

European Patent Office, Communication dated Oct. 9, 2014, issued in counterpart Application No. 12785307.5.
Japanese Patent Office, Communication dated Oct. 7, 2014, issued in counterpart Application No. 214510260.
Kawaguchi et al., "Thermally Expandable Microcapsules for Polymer Foaming—Relationship Between Expandability and Viscoelasticity.", Polymer Engineering and Science, vol. 50, No. 4, Apr. 2010, pp. 835-842.
Wu et al., "A Study of foaming agent in Bio-based polymer foams", Antec 2007 Plastics: Annual Technical Conference Proceeding, Curran Associated Inc., vol. 2, Jan. 1, 2007, p. 845-847.

\* cited by examiner

*Primary Examiner* — Michael G Miggins
(74) *Attorney, Agent, or Firm* — Sughrue Mion, PLLC

(57) ABSTRACT

Provided is a composition for a starch container, comprising: 20 to 60 weight % of an undenatured starch; 5 to 30 weight % of a pulp fiber powder; 0.1 to 2 weight % of a photocatalyst; 0.5 to 5 weight % of a release agent; and 0.01 to 5 weight % of a capsule type blowing agent preparations; and the remainder being a solvent. Also provided is a starch container using the composition. The above-described composition of the present invention may be used not only as a material for a disposable container which has improved blowing property, and which is lightweight and has improved moldability, but also as a material for an eco-friendly starch container having eco-friendly characteristics.

12 Claims, No Drawings

COMPOSITION FOR A STARCH CONTAINER, STARCH CONTAINER USING SAME, AND METHOD FOR MANUFACTURING THE STARCH CONTAINER

CROSS REFERENCE TO RELATED APPLICATIONS

This application is a National Stage of International Application No. PCT/KR2012/003889 filed May 17, 2012, claiming priority based on Korean Patent Application No. 10-2011-0046084 filed May 17, 2011, the contents of all of which are incorporated herein by reference in their entirety.

TECHNICAL FIELD

The present disclosure relates to a composition for a starch container, a starch container using same, and a method for manufacturing the starch container.

BACKGROUND ART

Foaming refers to a process of producing a cellular structure in a variety of materials such as plastics, rubbers, etc. by using a blowing agent whereby gas is produced under specific temperature, pressure and time conditions, thus giving foams.

Disposable containers may be classified into non-foam type and foam type etc. A non-foam type disposable container may be manufactured relatively easily by vacuum molding, pressure forming, etc. However, the non-foam type disposable container is problematic in that, when hot materials are put in the container, the heat may be transferred to outside without blocking and thus may cause burning of human skins which the container may be in contact with.

A foam disposable container may be manufactured from non-degradable plastic materials such as PS, PP, PE, etc. via a foaming process. Although the container may be lightweight, have good cushioning and insulating properties, and allow cost reduction, the disposable container which is made from synthetic resins or plastics may cause environmental pollution.

DISCLOSURE OF INVENTION

Technical Problem

The present disclosure is directed to providing an ecofriendly starch container composition, a starch container using same and a method for manufacturing the starch container. The ecofriendly starch container composition may be manufactured by using a solvent and a capsule-type blowing agent (foaming agent) as main components for blowing and thus may be used to make a disposable container having improved blowing property, being lightweight and having improved moldability.

Solution to Problem

In embodiments, there is provided a composition for a starch container, including: 20-60 wt % of an unmodified starch; 5-30 wt % of a pulp fiber powder; 0.1-2 wt % of a photocatalyst; 0.5-5 wt % of a release agent; 0.01-5 wt % of a capsule-type blowing agent; and a solvent as the remainder.

In another embodiments, there is provided a starch container formed using the composition. In an exemplary embodiment, the starch container composition is formed into a desired shape by heating and compressing the composition.

In another embodiments, there is provided a method for manufacturing a starch container, including: preparing a composition for a starch container, comprising: 20-60 wt % of an unmodified starch; 5-30 wt % of a pulp fiber powder; 0.1-2 wt % of a photocatalyst; 0.5-5 wt % of a release agent; 0.01-5 wt % of a capsule-type blowing agent; and a solvent as the remainder; and injecting the composition into a molding device heated to 100-300° C., and compressing at 0.5-10 kgf/cm$^2$, thereby forming the composition into a container having a desired shape.

Advantageous Effects of the Invention

A composition for a starch container according to the embodiments of the present disclosure may improve lightweightness and moldability of starch container products.

MODE FOR THE INVENTION

Hereinafter, the embodiments of the present disclosure are described in detail.

The present disclosure provides a composition for a starch container, including: 20-60 wt % of an unmodified starch; 5-30 wt % of a pulp fiber powder; 0.1-2 wt % of a photocatalyst; 0.5-5 wt % of a release agent; 0.01-5 wt % of a capsule-type blowing agent; and a solvent as the remainder.

In an exemplary embodiment of the present disclosure, the capsule-type blowing agent may comprise: an inner part including a hydrocarbon as a blowing agent; and an outer part including a thermoplastic material.

In an exemplary embodiment of the present disclosure, the hydrocarbon may be a material that is gasified at or below the softening point of the thermoplastic material and may be selected from a group consisting of propane, propylene, butene, n-butane, isobutane, isopentane, neopentane, n-pentane, n-hexane, isohexane, heptane, octane, nonane and decane. The thermoplastic material may be a material that can endure a pressure of 300 kg/cm$^2$ or higher and may be selected from a group consisting of nitrile-based monomer, methacrylic acid, methacrylic acid ester, methacrylamide, acrylic acid, acrylamide, styrene and vinyl acetate.

In an exemplary embodiment of the present disclosure, the capsule-type blowing agent may have a particle size of 3-50 μm. If the particle size is smaller than 3 μm, it is difficult to achieve sufficient foaming. And, if is larger than 50 μm, foam strength may decrease because of increased foam diameter.

The capsule-type blowing agent may be included in an amount of 0.01-5 wt % based on the total weight of the composition. If it is included in a larger amount, impact strength may decrease because of excessively high foaming tendency. And, if is included in a smaller amount, lightweightness may not be achieved because of decreased foaming tendency.

In an exemplary embodiment of the present disclosure, the unmodified starch may be one or more selected from a group consisting of cornstarch, potato starch, wheat starch, rice starch, tapioca starch and sweet potato starch.

If the unmodified starch is included in an amount less than 20 wt % based on the total weight of the composition, it may be difficult to uniformly disperse pulp and other additives because of insufficiency of the starch which acts as an organic binder. And, if it included in an amount exceeding 60 wt %, impact strength and water resistance may decrease.

Since the unmodified starch usually has a negative charge of 500 meq or higher, it tends to aggregate with each other. As a result, intermolecular binding energy is decreased and overall strength and water resistance decrease. To avoid this problem, the pulp may be pulverized into fine powder. If the fine pulp fiber powder is used, the inter-particle aggregation may be prevented since apparent density can be increased and volume can be decreased. As a result, overall strength including tensile strength, bending resistance, etc. can be improved.

The pulp fiber powder may be one or more selected from wood, straw, sugarcane, reed, bamboo, woody stem, bast fiber, leaf fiber and seed fiber.

If the pulp fiber has a length of 10-500 μm, it is easier to increase dispersibility of the pulp fiber in the composition and maintain strength at each portion of the molded product.

As the pulp fiber powder, one from a broadleaf tree, i.e. long fiber, and one from a coniferous tree, i.e. short fiber, show slight difference in fiber length-dependent distribution even when a screen of the same size is used.

The pulp fiber powder may be included in an amount of 5-30 wt % based on the total weight of the composition. If it is included in a larger amount, it may be difficult to disperse the pulp fiber powder. And, if it is included in a smaller amount, impact strength of the container decreases.

In the embodiments of the present disclosure, it is desirable to use pulp from a broadleaf tree, which is relatively superior in heat resistance, rather than one from a coniferous tree. If a pulp powder obtained from a coniferous tree is used, browning may occur in the finished product due to charring during molding.

In an exemplary embodiment of the present disclosure, the photocatalyst may be titanium dioxide having an anatase content of 70% or greater. In this case, sterilizing and deodorizing effect may be improved. Titanium dioxide is classified into rutile, anatase and brookite types depending on the crystal structure. The titanium dioxide having an anatase content of 70% means that 70% of the crystal structure of the titanium dioxide is anatase. The remaining 30% is mostly rutile and only a small minority is brookite. Since the anatase type titanium dioxide exhibits high activity for photocatalytic reactions, the titanium dioxide having an anatase content of 70% or greater may provide sufficient sterilizing and deodorizing effect.

The photocatalyst is used for sterilization or deodorization. As the photocatalyst, a titanium dioxide doped with a metal such as iron (III) ($Fe^{3+}$), vanadium (V), molybdenum (Mo), niobium (Nb), platinum (Pt), etc., or a metal oxide such as titanium dioxide, silicon dioxide ($SiO_2$), vanadium pentoxide ($V_2O_5$), tungsten oxide ($WO_3$), etc. may be used either alone or in combination.

The photocatalyst may be included in an amount of 0.1-2 wt % based on the total weight of the composition. If it is included in a larger amount, moldability and strength of the container may be negatively affected. And, if it is included in a smaller amount, it is difficult to achieve sterilizing and deodorizing effect.

In an exemplary embodiment of the present disclosure, the release agent may be one or more selected from a group consisting of monostearyl citrate and magnesium citrate.

The release agent may be included in an amount of 0.5-5 wt % based on the total weight of the composition. If it is included in a larger amount, moldability of the container may be negatively affected. And, if it is included in a smaller amount, the molded container may not be released from the mold.

In an exemplary embodiment of the present disclosure, the solvent may be selected from a group consisting of water, an alcohol, an alkaline aqueous solution and an acidic aqueous solution. Specifically, water may be used.

The present disclosure also provides a starch container formed into a desired shape by heating and compressing the composition.

The present disclosure also provides a method for manufacturing a starch container, including: preparing a composition for a starch container, comprising: 20-60 wt % of an unmodified starch; 5-30 wt % of a pulp fiber powder; 0.1-2 wt % of a photocatalyst; 0.5-5 wt % of a release agent; 0.01-5 wt % of a capsule-type blowing agent; and a solvent as the remainder; and injecting the composition into a molding device heated to 100-300° C., specifically 150-250° C., and compressing at 0.5-10 kgf/cm², specifically 3-6 kgf/cm², thereby forming the composition into a container having a desired shape. The forming by compressing may be performed for 5 seconds to 5 minutes, specifically for 20 seconds to 5 minutes.

Hereinafter, the present disclosure will be described in detail through examples, comparative examples and test examples. However, the following examples, comparative examples and test examples are for illustrative purposes only and it will be apparent to those of ordinary skill in the art that the scope of the present disclosure is not limited by the examples, comparative examples and test examples.

Examples 1-4

Preparation of Composition for Forming Starch Container

Unmodified, negatively charged cornstarch, pulp fiber powder, titanium dioxide having an anatase content of 70% or greater as a photocatalyst, magnesium stearate as a release agent, a capsule-type blowing agent, and water were mixed as described in Table 1 and stirred in a double jacket heating agitator for 10 minutes to prepare a composition for forming starch container.

The compositions of Examples 1-4 are described in Table 1.

TABLE 1

|  | Example 1 | Example 2 | Example 3 | Example 4 |
|---|---|---|---|---|
| Natural polymer (cornstarch) | 38.0 | 38.0 | 38.0 | 38.0 |
| Pulp fiber powder | 14.0 | 14.0 | 14.0 | 14.0 |
| $TiO_2$ having anatase content of 70% or greater | 0.5 | 0.5 | 0.5 | 0.5 |
| Release agent (Mg Stearate) | 0.8 | 0.8 | 0.8 | 0.8 |
| Capsule-type blowing agent | 0.2 | 0.5 | 1.0 | 1.5 |
| Water | 46.5 | 46.2 | 45.7 | 45.2 |
| Total | 100 | 100 | 100 | 100 |

Comparative Examples 5-8

Preparation of Composition for Forming Starch Container

Unmodified, negatively charged cornstarch, pulp fiber powder, titanium dioxide having an anatase content of 70% or greater as a photocatalyst, magnesium stearate as a release agent, an organic blowing agent, and water were mixed as described in Table 2 and stirred in a double jacket heating agitator for 10 minutes to prepare a composition for forming starch container.

The compositions of Comparative Examples 5-8 are described in Table 2.

TABLE 2

|  | Comparative Example 5 | Comparative Example 6 | Comparative Example 7 | Comparative Example 8 |
|---|---|---|---|---|
| Natural polymer (cornstarch) | 38.0 | 38.0 | 38.0 | 38.0 |
| pulp fiber powder | 14.0 | 14.0 | 14.0 | 14.0 |
| $TiO_2$ having anatase content of 70% or greater | 0.5 | 0.5 | 0.5 | 0.5 |
| Release agent (Mg stearate) | 0.8 | 0.8 | 0.8 | 0.8 |
| Organic blowing agent | 0.5 | 1.0 | 1.5 | 2.0 |
| Water | 46.2 | 45.7 | 45.2 | 44.7 |
| Total | 100 | 100 | 100 | 100 |

Comparative Examples 9-12

Preparation of Composition for Forming Starch Container

Unmodified, negatively charged cornstarch, pulp fiber powder, titanium dioxide having an anatase content of 70% or greater as a photocatalyst, magnesium stearate as a release agent, an inorganic blowing agent, and water were mixed as described in Table 3 and stirred in a double jacket heating agitator for 10 minutes to prepare a composition for forming starch container.

The compositions of Comparative Examples 9-13 are described in Table 3.

TABLE 3

|  | Comparative Example 9 | Comparative Example 10 | Comparative Example 11 | Comparative Example 12 | Comparative Example 13 |
|---|---|---|---|---|---|
| Natural polymer (cornstarch) | 38.0 | 38.0 | 38.0 | 38.0 | 38.0 |
| pulp fiber powder | 14.0 | 14.0 | 14.0 | 14.0 | 14.0 |
| $TiO_2$ having anatase content of 70% or greater | 0.5 | 0.5 | 0.5 | 0.5 | 0.5 |
| Release agent (Mg stearate) | 0.8 | 0.8 | 0.8 | 0.8 | 0.8 |
| Inorganic blowing agent | — | 0.5 | 1.0 | 1.5 | 2.0 |
| Water | 46.7 | 46.2 | 45.7 | 45.2 | 44.7 |
| Total | 100 | 100 | 100 | 100 | 100 |

Test Example 1

Physical Properties of Composition for Forming Starch Container

The compositions prepared in Examples 1-4 and Comparative Examples 5-13 were molded into container-shaped products using a molding device under the condition of 240° C. and 6 kgf/cm$^3$.

The physical properties of the molded products were evaluated as follows.

With regard to moldability, ⊚ means that the surface is smooth with no wrinkle or pinhole, ○ means that the surface is relatively rough but there is no wrinkle or pinhole, and X means that the surface has wrinkles or pinholes or molding is impossible.

Weight reduction (%) means the weight reduction of the container-shaped molded products of Examples 1-4 and Comparative Examples 5-13 relative to the container-shaped molded product of Comparative Example 9.

Molding time means the time required for drying the container-shaped molded product when performing molding in the molding device.

Compressive strength was measured by compressing the container-shaped molded product from both sides using a rod cell at a speed of 2 mm/s. The strength when the molded product failed was measured. ⊚ means that the compressive strength is 5 kg·m/s$^2$ or greater, ○ means that the compressive strength is 3.5 kg·m/s$^2$ or greater, and X means that the compressive strength is below 3.5 kg·m/s$^2$.

Offensive odor was tested by three panels who tested whether there was offensive odor other than the characteristic odor of starch. N means that there is no offensive odor, and Y means that there is offensive odor.

With regard to browning, the color of the container-shaped molded product was compared with that of a standard composition (cornstarch 38%, pulp fiber powder 14%, water 46%). N means that there is no browning, and Y means that there is browning.

Release property was evaluated as follows. While molding 100 container samples using the compositions of Examples and Comparative Examples, the number of the container samples adherent to the upper mold without falling down to the lower mold was counted.

Table 4 shows the result of testing moldability, weight reduction, molding time, compressive strength, offensive odor, browning and release property for Examples 1-4 and Comparative Examples 5-13.

TABLE 4

| | Moldability | Weight reduction (%) | Molding time (sec) | Compressive strength | Offensive odor | Browning | Release property |
|---|---|---|---|---|---|---|---|
| Example 1 | ◎ | 20 | 75 | ◎ | N | N | ○ |
| Example 2 | ◎ | 40 | 70 | ◎ | N | N | ○ |
| Example 3 | ◎ | 50 | 65 | ◎ | N | N | ○ |
| Example 4 | ◎ | 53 | 65 | ◎ | N | N | ○ |
| Comparative Example 5 | ◎ | 3 | 98 | ◎ | N | N | ○ |
| Comparative Example 6 | ◎ | 6 | 95 | ◎ | Y | N | ○ |
| Comparative Example 7 | ○ | 9 | 90 | ◎ | Y | Y | ○ |
| Comparative Example 8 | ○ | 12 | 85 | ◎ | Y | Y | ○ |
| Comparative Example 9 | ◎ | 0 | 100 | ◎ | N | N | ○ |
| Comparative Example 10 | ◎ | 5 | 98 | ◎ | N | N | ○ |
| Comparative Example 11 | ◎ | 11 | 96 | ◎ | N | Y | ○ |
| Comparative Example 12 | ○ | 17 | 90 | ◎ | Y | Y | ○ |
| Comparative Example 13 | ○ | 22 | 85 | ◎ | Y | Y | ○ |

Comparative Example 9 wherein no blowing agent was used showed good results in moldability, compressive strength, offensive odor, browning and release property but showed the worst results in weight reduction and molding time.

Comparative Examples 5-8 wherein the organic blowing agent was used showed weight reduction of 3-12% and showed severe offensive odor and change in color.

Comparative Examples 10-13 wherein the inorganic blowing agent was used showed weight reduction of 5-22% and showed severe offensive odor and browning.

Examples 1-4 wherein the capsule-type blowing agent was used showed very good moldability and also showed good results in compressive strength, offensive odor, browning and release property. In particular, weight reduction was 20-53% relative to Comparative Example 9. Also, molding time was reduced by 25-35 seconds when compared with Comparative Example 9. Accordingly, materials cost and energy cost can be reduced.

While the exemplary embodiments have been shown and described, it will be understood by those skilled in the art that various changes in form and details may be made thereto without departing from the spirit and scope of this disclosure as defined by the appended claims.

INDUSTRIAL APPLICABILITY

A composition for a starch container according to the present disclosure may be used to manufacture starch container products which are lightweight and have improved moldability.

The invention claimed is:

1. A composition for a starch container, comprising: 20-60 wt % of an unmodified starch; 5-30 wt % of a pulp fiber powder; 0.1-2 wt % of a photocatalyst; 0.5-5 wt % of a release agent; 0.01-5 wt % of a encapsulated blowing agent; and a solvent as the remainder,
wherein the encapsulated blowing agent comprises: an inner part comprising a hydrocarbon as a blowing agent; and an outer part comprising a thermoplastic material.

2. The composition for a starch container according to claim 1, wherein the encapsulated blowing agent has a particle size of 3-50 μm.

3. The composition for a starch container according to claim 1, wherein the unmodified starch is one or more selected from the group consisting of cornstarch, potato starch, wheat starch, rice starch, tapioca starch and sweet potato starch.

4. The composition for a starch container according to claim 1, wherein the pulp fiber powder has a fiber length of 10-500 μm.

5. The composition for a starch container according to claim 1, wherein the photocatalyst is titanium dioxide having an anatase content of 70% or greater.

6. The composition for a starch container according to claim 1, wherein the release agent is one or more selected from the group consisting of monostearyl citrate and magnesium citrate.

7. The composition for a starch container according to claim 1, wherein the solvent is one selected from the group consisting of water, an alcohol, an alkaline aqueous solution and an acidic aqueous solution.

8. A starch container formed into a desired shape by heating and compressing the composition according to claim 1.

9. The composition for a starch container according to claim 1, wherein the hydrocarbon is a material that is gasified at or below the softening point of the thermoplastic material and the thermoplastic material is a material that can endure a pressure of 300 kg/cm$^2$ or higher.

10. The composition for a starch container according to claim 9, wherein the hydrocarbon is selected from the group consisting of propane, propylene, butene, n-butane, isobutane, isopentane, neopentane, n-pentane, n-hexane, isohexane, heptane, octane, nonane and decane.

11. The composition for a starch container according to claim 9, wherein the thermoplastic material is selected from a group consisting of a nitrile-based monomer, methacrylic acid, methacrylic acid ester, methacrylamide, acrylic acid, acrylamide, styrene and vinyl acetate.

12. A method for manufacturing a starch container, comprising:
   preparing a composition for a starch container, comprising: 20-60 wt % of an unmodified starch; 5-30 wt % of a pulp fiber powder; 0.1-2 wt % of a photocatalyst; 0.5-5 wt % of a release agent; 0.01-5 wt % of a encapsulated blowing agent; and a solvent as the remainder; and
   injecting the composition into a molding device heated to 100-300° C. and compressing at 0.5-10 kgf/cm$^2$, thereby forming the composition into a container having a desired shape,
   wherein the encapsulated blowing agent comprises: an inner part comprising a hydrocarbon as a blowing agent; and an outer part comprising a thermoplastic material.

* * * * *